July 6, 1965　　　G. L. ATHERHOLT, SR　　　3,193,163
NON-ROTATING PNEUMATIC CHUCK ACTUATOR AND PART FEEDER
Filed Oct. 29, 1962　　　　　　　　　　　　　　3 Sheets-Sheet 1

INVENTOR.
GEORGE L. ATHERHOLT, SR.
BY
Barnes, Kisselle,
Raisch & Choate
ATTORNEYS July 6, 1965 G. L. ATHERHOLT, SR 3,193,163
NON-ROTATING PNEUMATIC CHUCK ACTUATOR AND PART FEEDER
Filed Oct. 29, 1962 3 Sheets-Sheet 2

INVENTOR.
GEORGE L. ATHERHOLT, SR.
BY Barnes, Kisselle,
Raisch & Choate
ATTORNEYS July 6, 1965 G. L. ATHERHOLT, SR 3,193,163
NON-ROTATING PNEUMATIC CHUCK ACTUATOR AND PART FEEDER
Filed Oct. 29, 1962 3 Sheets-Sheet 3
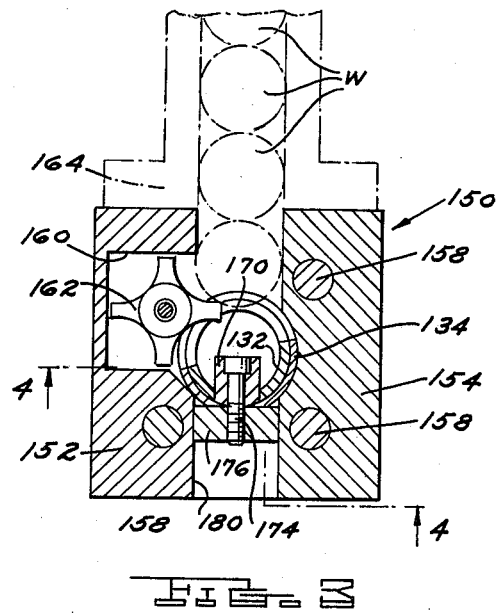
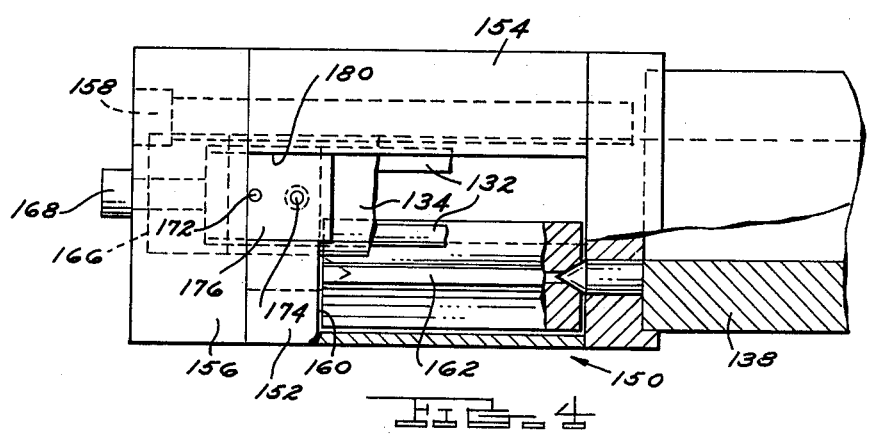
INVENTOR.
GEORGE L. ATHERHOLT, SR.
BY
Barnes, Kisselle, Raisch & Choate
ATTORNEYS 3,193,163
NON-ROTATING PNEUMATIC CHUCK ACTUATOR
AND PART FEEDER
George L. Atherholt, Sr., Warren, Mich., assignor to
A and C Engineering Co., Warren, Mich., a corporation
of Michigan
Filed Oct. 29, 1962, Ser. No. 233,838
8 Claims. (Cl. 226—165)

This invention relates to a non-rotating pneumatic chuck actuator and more particularly to a pneumatic type chuck operating device in which a piston is movable relative to its cylinder, one of these members being mounted on the end of a work rotating spindle opposite the chuck and the other member being connected to the chuck by means of a thrust tube extending along the axis of the spindle.

Examples of this type of mechanism utilized for a conventional collet chuck are found in U.S. patent to Williams, No. 2,726,090, dated December 6, 1955, and Manchester 2,886,007, dated May 12, 1959.

It is an object of the present invention to provide an improved chuck actuator device with simplified bearing arrangements and sealing arrangements and also a chuck actuator which can be utilized in connection with a pressure chuck of the expansible type such as shown, for example, in U.S. patent to Atherholt et al., No. 2,744,756, dated May 8, 1956.

It is another object of the invention to provide a fluid operated mechanism for a chuck which can be also utilized to feed work to a chuck through a hollow central tube of a chuck actuator and which can also serve in a work ejector system.

It is an object of the present invention to provide a combination device which can utilize pressure for work feed and chuck release at the same time.

Another object is the provision of a device which can be utilized either for feeding continuous stock or for feeding parts which are held by a hopper adjacent an actuator mechanism on one side of a spindle.

Other objects and features of the invention relating to details of construction and operation will be apparent in the following description and claims.

Figure 1:
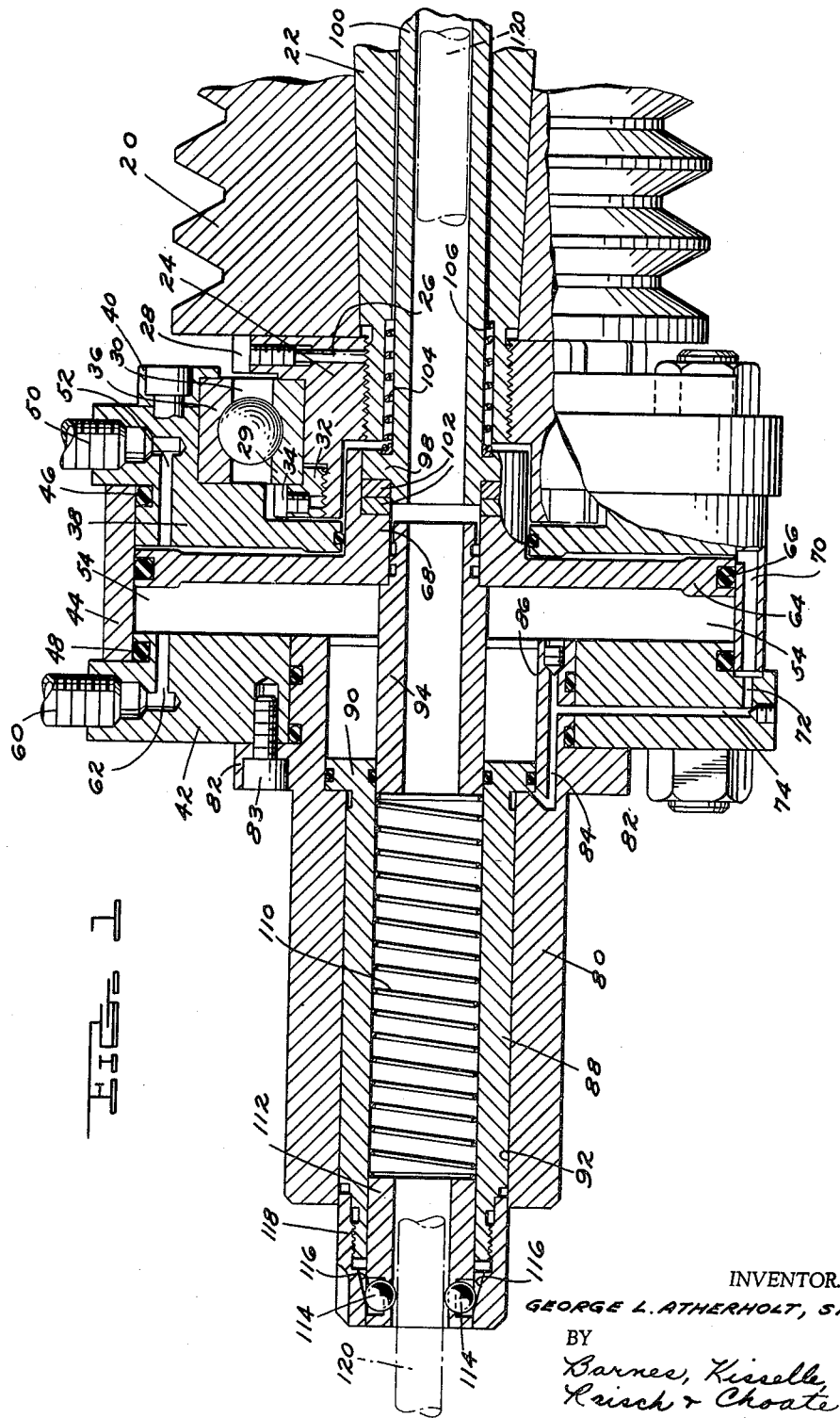

Drawings accompany the disclosure and the various views thereof may be briefly described as:

FIGURE 1, a sectional view of an assembly showing a chuck actuator and work feed device.

Figure 2:
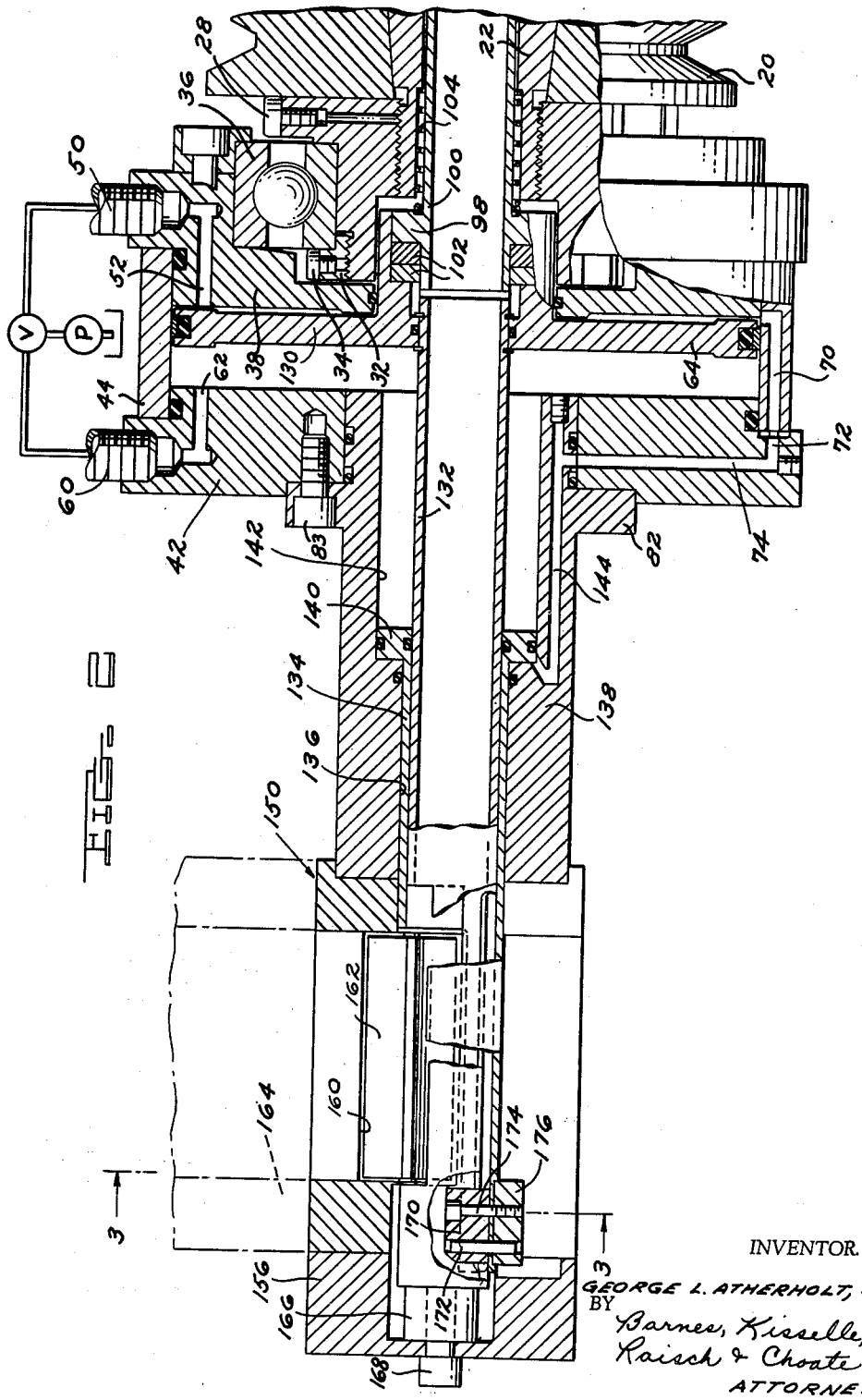

FIGURE 2, a sectional view of a chuck actuator assembly and a hopper feed type of device for work parts.

FIGURE 3, a sectional view of a parts feeder on line 3—3 of FIGURE 2.

FIGURE 4, a sectional view on line 4—4 of FIGURE 3.

In my co-pending application Serial No. 235,346, filed November 5, 1962, there is found a complete disclosure of a rotating spindle with a hydraulically actuated chuck on one end and a chuck actuator at the other. The present device is a modification of the disclosure in the co-pending application as respects the particular actuating piston-cylinder arrangement and also the work feeding arrangement.

In FIGURE 1, a sheave 20 of a spindle drive is shown mounted on spindle 22. A ring nut member 24 threaded on the spindle 22 is locked in place by a slug 26 positioned by a screw 28. An inner race 29 of a ball bearing assembly 30 is held between a flange on the ring nut 24 and a thread ring 32 again locked by a suitable screw 34. The outer race 36 of the ring is clamped against an end wall housing plate 38 by a clamping ring 40 suitably bolted to the housing plate 38.

A second end housing plate 42 is spaced from, but related to, the first end housing plate 38 by a cylindrical wall member 44 sealed to the respective end plates by O-rings 46 and 48. A pressure port opening 50 in housing 38 admits control pressure through a passage 52 to one side of a recess 54 between the end plates and a pressure port opening 60 admits pressure through a passage 62 in end plate 42 to the other side of recess 54. Disposed between the end plates is a piston plate 64 having an O-ring seal 66 on the outer periphery and formed on a hub 68 which acts within a recess formed by a central bore in plate 38 and a short bore in lock ring 24.

A short L-shaped passage 70 axially of cylindrical wall member 44 opens to the right-hand side of recess 54 at one end and opens at the other end into a short axial passage 72 and a radial passage 74 in end plate 42. Mounted in a central bore in end plate 42 is a transfer cylinder 80 which is suitably sealed in the bore within the plate 42 and clamped thereto by a flange 82 with suitable bolts 83. A short passage 84 in this transfer cylinder connects radial passage 74 to the extreme right-hand end of a recess cylinder 86 at the right-hand end of the transfer cylinder 80. A work transfer piston 88 has a piston flange 90 movable in sealed relation to the walls of the cylinder 86, the remainder of the transfer piston being slidably received in a bore 92 in the transfer cylinder 80.

A short slide tube 94 has one end mounted in a central bore in the hub 68 of piston plate 64 and the other end mounted for reciprocation relative to the piston 90. In the other end of the hub 68 of the piston plate is mounted a flange end 98 of an actuator tube 100 extending through the spindle. This actuator tube serves to actuate a piston (not shown) which can create or relieve pressure in a hydraulic chuck such as shown in the above-identified Atherholt patent. Suitable spacing rings 102 are disposed adjacent the flanged end 98 and a spring 104 is interposed between the flanged end 98 and a shoulder 106 on the inner bore of the spindle 22.

The other end of the slide tube 94 serves as a seat for a long compression spring 110 which backs up at its other end against a carrier tube 112 for a ball clutch which carries balls 114 in suitably formed recesses. These balls bear on one side against angled walls 116 in a short clutch nut 118 threaded on the end of the transfer cylinder 88. Thus, the motion of the clutch ball carrier 112 under the pressure of the spring forces the balls 114 inwardly. A piece of bar stock 120 which is fed through the openings of the assembly will be locked in place by the balls 114 against motion to the left. The bar stock, however, can be advanced by moving the entire assembly including the transfer piston 88 to the right.

In the operation of the device, it will be understood that pressure in the port 50 will cause plate piston 64 to shift to the left pulling with it the actuator tube 100 which, as previously described, can actuate a pressure piston (not shown) and release chuck pressure. Pressure on the right-hand side of the plate piston 64 will also be transmitted through the passage 70 to passages 72, 74 and 84 to the left-hand end of flange 90 of the transfer piston 88. This causes the transfer piston to move to the right and will also pull the work bar 120 to the right. Release of pressure in port 50 and a transfer of pressure to the port 60 will cause retraction of the piston flange 90 and will also move the plate piston 64 to the right to actuate a chuck-locking mechanism, for example, a pressure piston (not shown) to a chuck locking position (not shown). Thus, the device is ready for another operation. The stroke of the piston 88–90 can be varied by changing the depth of the recess 86 in the transfer cylinder 80. Smaller diameter stock could also be handled by changing the bore in guide 94 and the size of clutch assembly 112–116.

In FIGURES 2, 3, and 4, a modified structure is shown for feeding individual parts from a hopper supply. As viewed in FIGURE 2, the parts of the chuck actuator on the right-hand side of the drawing are identical with those previously described. The plate piston 130 in FIGURE 2 is slightly altered from that shown in FIGURE 1 and it carries centrally a draw tube 132 which is mounted within a tubular transfer piston 134 slidably disposed in a bore 136 of a transfer cylinder 138. The work transfer piston 134 has a piston flange 140 which acts in a bore 142 in the transfer cylinder. Connecting passage 74 in end plate 42 to the left-hand end of the bore 142 is a passage 144.

Mounted on the left-hand end of the transfer cylinder 138 is a hopper body 150 formed by two plates (see FIGURE 3) 152 and 154 joined by an end plate 156. The assembly is held together by bolts 158. In the side plate 152 is a longitudinal slot 160 in which is mounted on a suitable axis pin a longitudinally extending star wheel 162 having four radial blades. A hopper 164 mounted on the hopper body 150 feeds work parts W down to a level where they are stopped by one of the blades of the rotor. At this point, both the tube 132 and the piston tube 134 are provided with an upper segmental recess large enough to admit a workpiece to the interior of said tubes.

The left-hand end of the slide tube 132 is piloted on a plug 166 in an end recess of the end plate 156 held in place by bolt 168 and slidable in a slot in the lower side of the tube 132 is a transfer dog 170 mounted interiorly on the lower wall of the transfer piston tube 134 (see FIGURE 2). A dowel 172 and a bolt 174 clamp the dog to an exterior guide block 176. Thus, as a workpiece falls into the tube 132 from the hopper 160, it will rotate the star wheel 162 which will block further motion of the workpieces at this point in the operation. When pressure is admitted to port opening 50 at the right-hand side of piston plate 130, it is also transferred through passages 70, 72, 74 and 144 to the left-hand side of piston 140 and thus causes the transfer piston and transfer tube 134 to shift to the right. This pulls the dog 170 with the guide block 176 acting in a bottom channel 180 between plates 152 and 154 and picks up the workpiece and moves it to the right through the tube 132. One workpiece will force another along the tube until it reaches an actuator tube 100 and thus workpieces can be moved along the hollow chuck (not shown) at the operating end of the spindle. Pressure relieved from port opening 50 and introduced into port opening 60 will again move the plate piston 130 to the right to a chuck locking position and it will shift the piston 140 back to a pick-up position ready for another workpiece.

I claim:
1. An operating and work feeding mechanism for a lathe chuck having an elongate actuating tube extending through the headstock spindle which comprises:
   (a) an annular support on said spindle,
   (b) a stationary double cylinder housing mounted on said support in rotatable relation thereto, said double cylinder comprising:
   (c) a first main cylinder and a second concentric cylinder open to and coaxial with said first main cylinder,
   (d) an actuating piston in said main cylinder connected to said actuating tube, and shiftable to a chuck locking position and a chuck release position,
   (e) a work transfer piston in said second cylinder open to said actuating position to shift work through said tube and shiftable to a retracted position and a work advancing position,
   (f) means to direct pressure selectively to said cylinders between the facing sides of said pistons simultaneously and through the stationary housing to the opposite sides of said pistons wherein when said actuating piston is in a chuck locking position said transfer piston is in a retracted position and when said actuating piston is in a chuck unlocking position, said transfer piston is in a work advancing position, and
   (g) means on said work transfer piston for engaging a workpiece to move it toward and through said actuating tube.

2. An operating and work feeding mechanism as defined in claim 1 in which the chuck actuating tube extends from one side of said piston in said main cylinder and a work feed tube aligned with said chuck actuating tube extends from the other side of said piston in said main cylinder, said work transfer piston comprising a tube telescoping over said work feed tube having a piston flange portion operating in said second cylinder.

3. An operating and work feeding mechanism as defined in claim 2 in which the work feed tube and the transfer piston tube are each apertured radially to receive a workpiece through said apertures, said transfer piston tube carrying a transfer dog to engage a workpiece within said tubes to carry it through said work feed tube to said chuck actuating tube and thus to a work chuck.

4. In a lathe head stock spindle mechanism of the type having a chuck operable to engage and release a workpiece responsive to movements of an actuating tube within said mechanism and having a work feeding unit to move work selectively and axially through said spindle mechanism to a chuck, improved structure comprising:
   (a) a stationary housing forming a cylinder opening having opposed ends with pistons opposed to each other in said cylinder,
   (b) one of said pistons having a relatively short stroke adapted to lock and unlock a chuck mechanism, the second of said pistons having a relatively longer stroke, from a work pick-up position to a work-shifted position,
   (c) means connected to said second piston to engage a workpiece to shift it axially in said spindle mechanism,
   (d) means to introduce actuating fluid to said cylinder between said pistons to urge each away from each other to the opposed ends of said cylinder to a work-lock position for said first piston and a work pick-up position for said second piston.
   (e) means to introduce actuating fluid to the opposed ends of said cylinders to shift said pistons toward each other to a work-release position for said first piston and a work-shifted position for said second piston, and
   (f) a hollow work-carrying tube coaxial with and carried in said pistons and telescopically related with one of said pistons to seal the cylinder from an axial work passage in said spindle mechanism.

5. A device as defined in claim 4 in which work-engaging means is operably associated with said second piston shiftable thereby, said work-engaging means comprising opposed unidirectional ball clutch means for gripping an elongate workpiece to shift it axially of the mechanism.

6. A device as defined in claim 5 in which said ball clutch mechanism comprises an axially movable cylindrical member carrying opposed balls circumferentially spaced, a resilient means interposed between said cylindrical member and said hollow work-carrying tube whereby said cylindrical member is axially biased away from said pistons, and means annularly surrounding said cylindrical member having a conical surface converging away from said pistons to urge said opposed balls inwardly.

7. A device as defined in claim 4 in which a work-supply means is associated with said mechanism comprising a hopper having a recess which terminates in alignment with said work-carrying tube, and means operated by said second piston movable through the said recess to shift a workpiece axially in said mechanism.

8. A device as defined in claim 4 in which a work-supply means is associated with said mechanism comprising a hopper having a recess which terminates in alignment with said work-carrying tube, an escape mechanism in said recess for transferring workpieces, one at a time, to align with said work-carrying tube and means operated by said second piston movable through the said recess to shift a workpiece axially in said mechanism through said pistons to a work-engaging chuck.

References Cited by the Examiner
FOREIGN PATENTS
511,097   8/39   Great Britain.

ROBERT B. REEVES, *Acting Primary Examiner.*
ANDRES H. NIELSEN, *Examiner.*